UNITED STATES PATENT OFFICE.

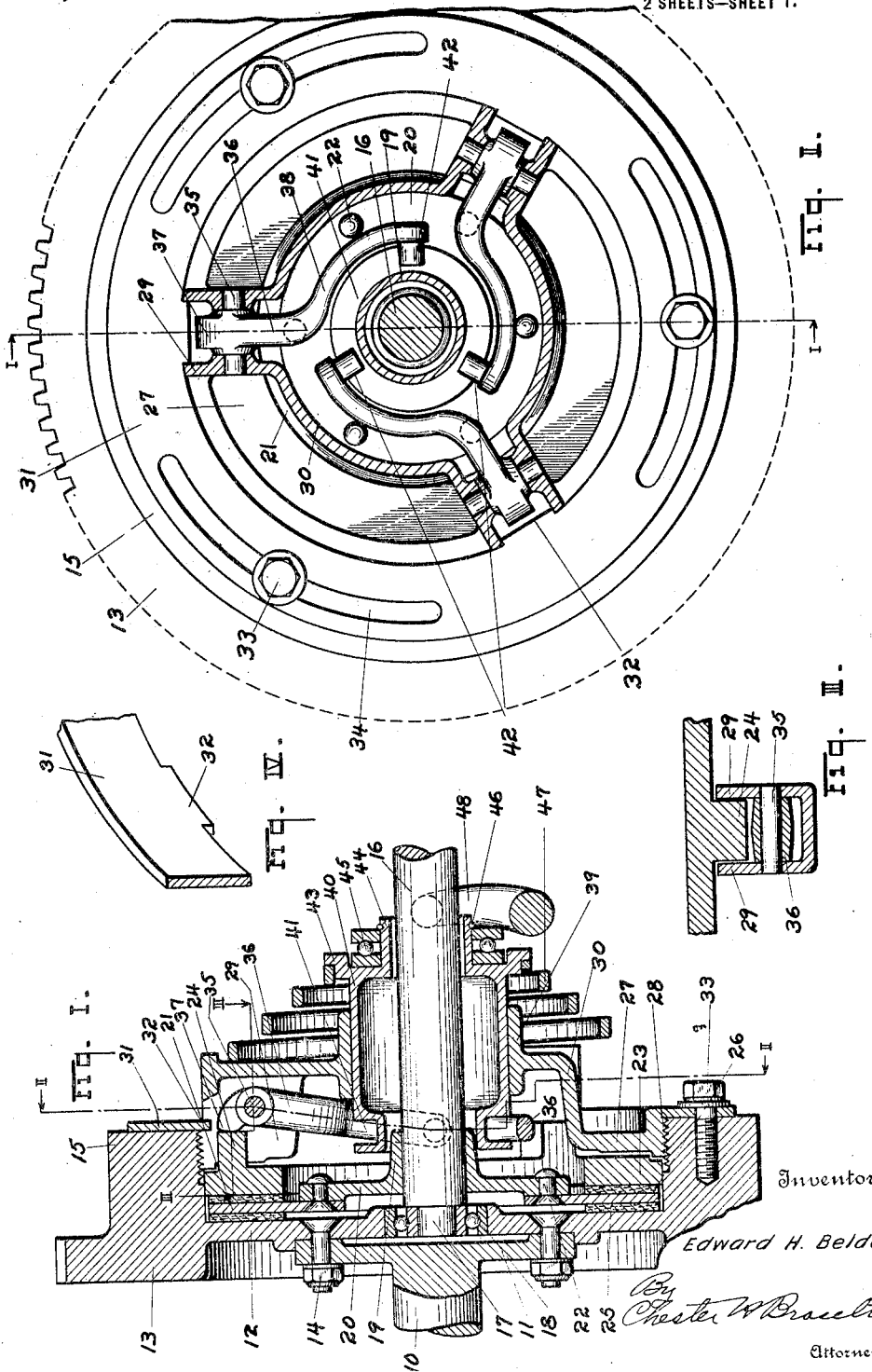

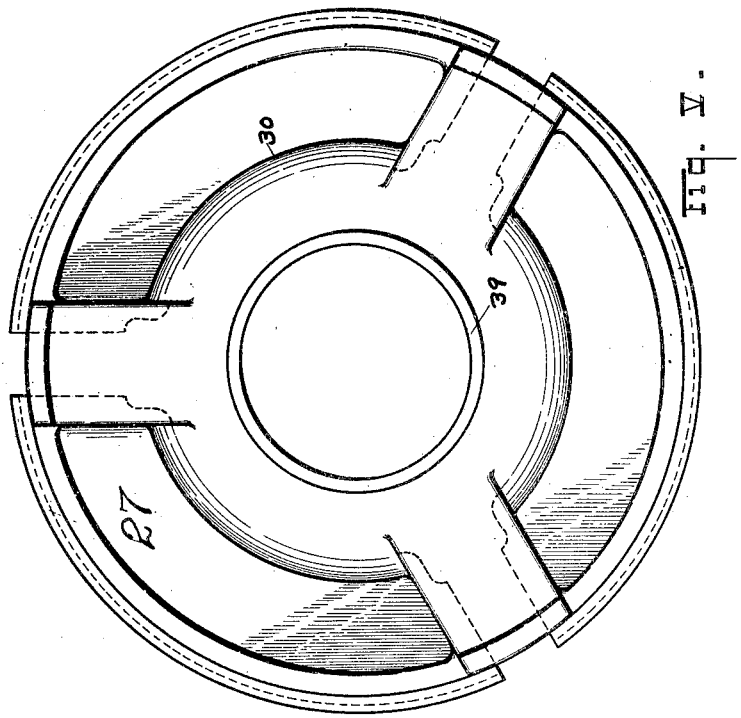
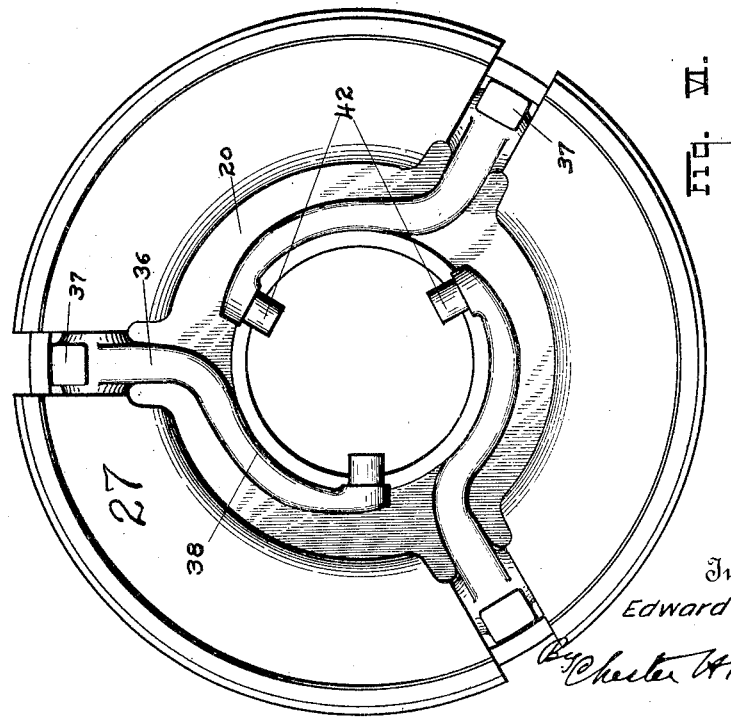

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

CLUTCH.

1,381,960.        Specification of Letters Patent.        Patented June 21, 1921.

Application filed July 22, 1918. Serial No. 246,208.

*To all whom it may concern:*

Be it known that I, EDWARD H. BELDEN, a citizen of the United States, residing at Toledo, in the county of Lucas and State of Ohio, have invented certain new and useful Improvements in Clutches, of which I declare the following to be a full, clear, and exact description.

This invention relates to clutches and more particularly to transmission shaft driving clutches for motor vehicles.

One of the objects of my invention is to provide an improved clutch construction in which adjustment for wear may be very easily made.

A further object of my invention is to provide a clutch construction such that an unequal or uneven adjustment on opposite sides of the clutch will not cause the operating parts to bind on the driven shaft.

A still further object of my invention is to provide a clutch construction in which the parts can be very easily disconnected and removed for inspection or repair.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a longitudinal, sectional elevation of a clutch embodying the invention taken substantially on the line I—I of Fig. II.

Fig. II is a transverse, sectional elevation taken substantially on the line II—II of Fig. I.

Fig. III is a detail, sectional view taken substantially on the line III—III of Fig. I.

Fig. IV is a detail, perspective view of a portion of the locking ring.

Fig. V is a view in elevation of the rear face of the clutch lever fulcrum plate, and Fig. VI is a similar view of the front face of the plate.

In the drawings, similar reference numerals refer to similar parts throughout the several views, and the sectional views are taken looking in the direction of the small arrows at the ends of the section lines.

Considering the numbered parts of the drawing, I have shown a clutch comprising the driving shaft 10 provided with a radially extending flange 11 which is secured to the main web 12 of the fly wheel 13 by means of bolts 14. The fly wheel rim is provided with a rearwardly extending annular portion 15 in which is formed a substantially cylindrical chamber for housing certain of the clutch parts.

The driven or transmission shaft 16 extends in axial alinement with the driving shaft 10 and is provided with a reduced forward end 17 which is journaled in a bearing 18 mounted in an axial opening in the web 12 of the fly wheel 13. The hub 19 of a disk 20 is suitably secured upon the forward end of the driven shaft 16 so as to turn therewith and a clutch ring or disk 21 which is disposed within the chamber formed in the fly wheel is secured near its inner periphery to the disk 20 by means of rivets 22. A thrust ring 23 is disposed within the cylindrical chamber formed in the fly wheel 13, the clutch ring 21 being disposed between the web 12 of the fly wheel and said thrust ring 23. The thrust ring is provided with equally spaced rearwardly extending projections or lugs 24, as shown in Figs. I and III. A ring 25 of friction material is disposed between the web 12 of the fly wheel and the clutch ring 21 and a similar ring 26 of friction material is disposed between the clutch ring 21 and the thrust ring 23. The chamber formed in the fly wheel 13 is closed by the lever fulcrum plate 27 having its periphery externally threaded at 28 so that it may be screwed into the internally threaded portion 15 of the fly wheel 13. The lever fulcrum plate 27 is provided with a plurality of forwardly extending pairs of spaced lugs 29 projecting from the cup-shaped portion 30 of the plate, there being one pair of lugs for each rearwardly extending projection 24 on the thrust ring 23.

A locking ring 31 is provided for the lever fulcrum plate and is of substantially the diameter of the portion 15 of the fly wheel and is provided on its inner periphery with a plurality of projecting portions 32 which are of such width as to snugly fit between the lugs 29 of said fulcrum plate. The locking ring 31 is also provided with a plurality of arcuate slots 34, each formed on an arc having its center at the axial center of the cover plate, said locking ring being secured to the fly wheel by means of the bolts 33 which extend through said slots 34 into the portion 15 of the fly wheel. Each pair of lugs 29 carries a pin 35 on which a lever 36 is fulcrumed, each of said levers being provided at its outer end with short arms 37 which are adapted to engage the projecting lugs 24 on the thrust ring 23, the inner ends of the levers being curved as indicated at 38 to agree substantially with the curvature of the wall 30 of the cover plate.

The cup-shaped portion 30 of the fulcrum plate is formed with a central hub or bearing 39 in which a clutch actuating sleeve 40 is slidably mounted, the forward end of said sleeve 40 being provided with a circumferential groove 41 in which the laterally extending fingers or studs 42 on the inner ends of the levers 36 are disposed, said inner ends of the levers being preferably curved, as shown in Fig. II. The rear end of the sleeve 40 is provided with a radially extending flange 43 and with a reduced rearwardly extending tubular portion 44 on which is mounted a thrust bearing 45 which is secured in place by the locking ring 46. A compression spring 47 is mounted between the flange 43 and the rear face of the fulcrum plate 27, as shown in Fig. I. The forks of the clutch releasing lever 48 are adapted to engage the thrust bearing 45 so that when the lever is operated to release the clutch the sleeve 40 will be moved forward against the tension of the spring 47 so as to move the outer ends 37 of the levers 36 rearwardly to disengage the projections 24 of the thrust ring 23.

From the description of the parts given above, the operation of this device can be very readily understood. It will be seen that the fly wheel 13 is continuously driven from the driving shaft 10 since it is connected therewith. The lever fulcrum plate 27, being screwed into the interior of the rearwardly extending portion 15 of the fly wheel, is driven therewith, said plate being also locked to the fly wheel by means of the locking ring 31 bolted to the fly wheel.

The thrust ring 23 which is mounted within the fly wheel is movable axially thereof, but rotates therewith because of the engagement of the rearwardly projecting lugs 24 with the outer ends of the levers 36, the clutch ring being connected to the driven shaft 16 to drive the same when the parts are in the position shown in Fig. I, it being understood that the spring 47 normally holds the sleeve 40 in position to cause the levers 36 to maintain the parts in clutching position.

When it is desired to release the clutch, the actuating lever 48 is operated to press against the thrust bearing 45 thereby moving the sleeve 40 forwardly against the action of the spring 47 and at the same time moving the clutch actuating levers to release position to permit the fly wheel to rotate without driving the transmission shaft. In case it is necessary to adjust the parts of the clutch to compensate for wear, the bolts 33 are loosened so as to allow the lever fulcrum plate to be screwed into or out of the fly wheel to provide for the proper adjustment of the friction plates relatively to the fly wheel. When the desired adjustment has been given to the parts by means of this turning of the lever fulcrum plate in the fly wheel, the bolts 33 are again tightened and the lever fulcrum plate is thus locked in place. In case a greater adjustment is needed than that allowed by the limits of the slots 34, the bolts 33 can be entirely removed and thus a greater movement can be given to the fulcrum plate, since there is nothing to limit the rotation of the locking ring 31 relatively to the fly wheel. The bolts 33 can then be screwed back into the fly wheel to hold the locking ring in its new position of adjustment.

It will be seen that the clutch actuating sleeve 40 is slidably mounted in the lever fulcrum plate 27 and not on the driven shaft 16 and that there is a considerable space between the extension 44 of the sleeve 40 and the driven shaft 16 so that any unequal adjustment of the cover plate will not cause the sleeve to tilt and bind on the driven shaft 16. Furthermore, the forward end of the sleeve 40 containing the groove 41 is of the same diameter as the major portion of said sleeve, so that the entire sleeve can be withdrawn from its bearing in the hub 39 of the cover plate when the levers 36 are disconnected. This greatly facilitates the disassembling of the parts of the clutch and renders them much more accessible. The levers may be removed by unscrewing the cover plate from the fly wheel and driving out the pivot pins 35.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A device of the class described, comprising the combination of a driving fly wheel having a chamber formed therein; a thrust ring within said chamber movable axially of the fly wheel; laterally extending projections upon said thrust ring; a driven shaft; a clutch ring fixed to said driven shaft and disposed in said chamber between said fly wheel and said thrust ring; a cover plate secured upon said fly wheel and having forwardly extending portions engaging and interlocking with said projections; levers pivotally supported on said cover plate independently of said thrust ring and inclosed by the cover plate; and means for actuating the levers to move said thrust ring into engagement with said clutch ring.

2. A device of the class described, comprising the combination of a driving fly wheel having a chamber formed therein; a thrust ring housed within said chamber and provided with a plurality of laterally extending projections; a driven shaft; a clutch ring fixed upon said shaft and disposed within said chamber between said fly wheel and said thrust ring; a cover plate secured upon said fly wheel having a plurality of laterally extending lugs separate from but in engagement with the projections on said thrust ring; levers fulcrumed upon said lugs and bearing against the ends of said projections; and means exteriorly of the cover plate for actuating said levers.

3. A device of the class described, comprising the combination of a driving fly wheel having a chamber formed therein; a thrust ring housed within said chamber, provided with a plurality of rearwardly extending projections; a driven shaft; a clutch ring fixed to said driven shaft and interposed between said fly wheel and said thrust ring; a cover plate secured upon said fly wheel having laterally extending lugs engaging said projections on opposite sides thereof; levers pivotally supported upon said cover plate independently of said thrust ring and inclosed by the cover plate; and means for actuating said levers to move said thrust ring into and out of driving contact with said clutch ring.

4. A device of the class described, comprising the combination of a driving fly wheel having a chamber formed therein; a thrust ring housed within said chamber, movable axially of said fly wheel; a plurality of lateral projections upon said thrust ring; a driven shaft; a clutch ring fixed to said driven shaft and interposed between said fly wheel and said thrust ring; a plate secured upon said fly wheel having lugs extending on opposite sides of the projections; levers fulcrumed between said lugs and adapted to engage the ends of said projections; and means for actuating said levers in opposite directions.

5. A device of the class described, comprising the combination of a driving fly wheel having a chamber formed therein; a thrust ring housed within said chamber and movable axially thereof; a driven shaft; a clutch ring fixed to said driven shaft and interposed between said fly wheel and said thrust ring; a plate screwed upon said fly wheel; a plurality of levers fulcrumed upon said plate for actuating said thrust ring axially of the fly wheel; a locking ring having projections engaging said plate to lock the same and provided with a plurality of arcuate slots; bolts screwed into said fly wheel and projecting through said slots for adjustably securing said locking ring upon said fly wheel; and means for actuating said levers.

6. A device of the class described, comprising the combination of a driving fly wheel provided with a rearwardly extending flange forming a chamber within said fly wheel; a thrust ring housed within said chamber, movable axially of the fly wheel and provided with a plurality of laterally extending projections; a driven shaft; a clutch ring fixed to said driven shaft and interposed between said fly wheel and said thrust ring; a cover plate secured upon said flange, said cover plate being provided with a plurality of pairs of laterally extending members between which said projections extend; and a locking ring adjustably secured to said flange and provided with locking portions disposed between each of said pairs of laterally extending members.

7. A device of the class described, comprising the combination of a fly wheel having a chamber formed therein; a thrust ring housed within said chamber and movable axially of the fly wheel, said ring being provided with a plurality of laterally extending projections; a driven shaft; a clutch ring fixed to said shaft and interposed between said fly wheel and said thrust ring; a cover plate secured upon said fly wheel and having spaced laterally extending lugs adapted to engage the opposite sides of said projections; a locking ring provided with a plurality of arcuate slots and having inwardly projecting portions disposed between said spaced lugs; and bolts passing through said arcuate slots into engagement with said fly wheel and adjustably securing said locking ring upon said fly wheel.

8. A device of the class described, comprising the combination of a driving fly wheel having a chamber formed therein; a thrust ring housed within said chamber and movable axially of the fly wheel, said thrust ring being provided with a plurality of rearwardly extending projections; a driven shaft; a clutch ring fixed to said shaft and disposed between said fly wheel and said thrust ring; a cover plate adjustably secured to said fly wheel and provided with a plurality of pairs of forwardly extending lugs, each of said projections on the thrust ring being disposed between one of said pairs of lugs; a lever fulcrumed between each of said pairs of lugs and engaging the rear end of one of said rearwardly extending projections on the thrust ring; and means for actuating said levers to move said thrust ring axially of the fly wheel.

9. A device of the class described, comprising the combination of a driving fly wheel; a chamber formed therein; a thrust ring housed within said chamber and movable axially of the fly wheel, said thrust ring being provided with a plurality of rearwardly extending projections; a driven shaft; a clutch ring fixed to said driven shaft and interposed between said fly wheel and said thrust ring; a cover plate secured to said fly wheel and adapted to close said chamber; a plurality of lugs upon said cover plate overlapping said projections and coöperating with the projections to lock said thrust ring upon said fly wheel to prevent rotation thereof relatively to said fly wheel; and a plurality of levers pivoted on said lugs and engaging the rear ends of the projections on the thrust ring to actuate the latter axially of the fly wheel.

10. A device of the class described, comprising the combination of a driving fly wheel having a chamber formed therein; a thrust ring mounted in said chamber and movable axially of the fly wheel, said thrust ring being in interlocking engagement with said fly wheel to prevent relative rotation of said parts; a driven shaft; a clutch ring fixed thereon and interposed between said fly wheel and said thrust ring; a cover plate secured to said fly wheel and closing said chamber, said cover plate being provided with a central bearing sleeve; a clutch actuating sleeve slidably mounted in said bearing sleeve and removable rearwardly therefrom, the forward end of said clutch sleeve being provided with a groove; a plurality of actuating levers fulcrumed upon said cover plate and having fingers at their inner ends extending laterally and disposed in said groove; a spring seated upon the rear face of the cover plate and operatively connected with said sleeve for moving it in one direction and means exteriorly of the cover plate for moving said clutch actuating sleeve in an opposite direction.

In testimony whereof, I affix my signature.

EDWARD H. BELDEN.